US012694308B2

(12) United States Patent (10) Patent No.: US 12,694,308 B2
Fu et al. (45) Date of Patent: Jul. 28, 2026

(54) NEIGHBORHOOD-BASED LINK PREDICTION FOR RECOMMENDATION SYSTEMS

(71) Applicants: Hao-Ming Fu, New York, NY (US);
Patrick Poirson, Gilbert, AZ (US);
Kwot Sin Lee, Weehawken, NJ (US);
Chen Wang, Great Neck, NY (US)

(72) Inventors: Hao-Ming Fu, New York, NY (US);
Patrick Poirson, Gilbert, AZ (US);
Kwot Sin Lee, Weehawken, NJ (US);
Chen Wang, Great Neck, NY (US)

(73) Assignee: Snap Inc., Santa Monica, CA (US)

( * ) Notice: Subject to any disclaimer, the term of this patent is extended or adjusted under 35 U.S.C. 154(b) by 792 days.

(21) Appl. No.: 18/090,789

(22) Filed: Dec. 29, 2022

(65) Prior Publication Data

US 2024/0220830 A1 Jul. 4, 2024

(51) Int. Cl.
*G06N 5/04* (2023.01)
(52) U.S. Cl.
CPC ....................................... *G06N 5/04* (2013.01)
(58) Field of Classification Search
CPC ........................................................ G06N 5/04
See application file for complete search history.

(56) References Cited

U.S. PATENT DOCUMENTS

| | | | |
|---|---|---|---|
| 2015/0350324 A1* | 12/2015 | Hu ....................... | H04L 67/1097 |
| | | | 709/219 |
| 2020/0167426 A1* | 5/2020 | Scheideler .......... | G06F 16/9024 |
| 2021/0287273 A1* | 9/2021 | Janakiraman .......... | G06N 20/10 |
| 2023/0195733 A1* | 6/2023 | Tan .......................... | G06N 3/04 |
| | | | 707/769 |
| 2023/0267317 A1* | 8/2023 | Shin ....................... | G06N 3/084 |
| | | | 706/17 |

* cited by examiner

*Primary Examiner* — Reji Kartholy
(74) *Attorney, Agent, or Firm* — CM Law; Stephen J. Weed

(57) ABSTRACT

A recommendation system implements a linkage (connectivity) score learning algorithm for user-item interaction bipartite graphs that is combined with a lightweight iterative degree update process in the bipartite graph where the degrees used in the scoring formula are updated several times to exploit local graph structures without any node (user/item) modeling. In the linkage score learning algorithm, for user u1 and item i2, the predicted linkage score between them is the sum over all sub-scores of each 3-step linkage path between u1 and i2. The linkage score learning algorithm pre-defines 6 learnable candidate parameter values, selects the best combination of parameters, and predicts a set of linkage scores that can be used for recommendation systems. The linkage score learning algorithm addresses the problem of link prediction by predicting new links in a graph that do not already exist in training data.

17 Claims, 9 Drawing Sheets

$$\hat{y}(i_2|u_1) = (d_{u_1}^{\alpha} \cdot d_{i_1}^{\beta} \cdot d_{u_2}^{\gamma} \cdot d_{i_2}^{\delta})^{-1}$$

$$\hat{y}(i_2|u_1) = (d_{u_1}^{\alpha} \cdot d_{i_1}^{\beta} \cdot d_{u_2}^{\gamma} \cdot d_{i_2}^{\delta})^{-1}$$

Gowalla- Recall@20

Yelp2018 - Recall@20

Amazon-Book-Recall@20

LastFM- Recall@20

Gowalla - NDCG@20

Yelp2018 - NDCG @20

Amazon-Book - NDCG@20

LastFM - NDCG@20

NEIGHBORHOOD-BASED LINK PREDICTION FOR RECOMMENDATION SYSTEMS

TECHNICAL FIELD

Examples set forth herein generally relate to item recommendation systems and, in particular, to a linkage score learning system for bipartite graphs that aligns link prediction with item recommendations.

BACKGROUND

In recent years, users are often confounded with the paradox of choice: how could one effectively find the best items to consume when there are just too many of them? For decades, recommendation systems have been heavily researched to mitigate this issue, and often with success in enhancing users' experiences. Collaborative filtering (CF) methods, which aim to utilize the explicit or implicit user-item interaction data within a service to find relevant items for users to consume, are some of the most effective approaches widely adopted in the industry for personalized recommendations.

Graph Neural Network (GNN)-based CF models, such as NGCF, LightGCN, and GTN have achieved tremendous success and significantly advanced the state-of-the-art. While there is a rich literature of such works using advanced models for learning user and item representations separately, item recommendation is essentially a link prediction problem between users and items. Furthermore, while there have been early works employing link prediction for collaborative filtering, this trend has largely given way to works focused on aggregating information from user and item nodes, rather than modeling links directly.

Within the domain of recommendation systems, the widely accepted baseline has been to employ Matrix Factorization (MF) to represent user and items in terms of latent factors, as achieved through either memory-based approaches or model-based approaches. The core idea is to model users and items such that, ideally, similar users and items would have their representations located closely within an embedding space. The recommendation problem is then solved through matching users to items with the highest affinity, often determined through a dot product of their latent factors or with a neural network. However, these MF techniques have only made use of the user-item interaction data implicitly. When considering this data as a bipartite graph with users and items as the nodes, it is possible to explicitly incorporate such graph information for modeling: if a user has interacted with an item, then there exists a binary link between the two. In this regard, GNN-based CF models like NGCF, LightGCN, and GTN are the state-of-the-art models in exploiting such graph data for recommendations.

Item recommendation is essentially a link prediction problem on a user-item bipartite graph. Despite the success of employing GNN for collaborative filtering, a key limitation is that they still learn representations on nodes, and measure the affinity between two node representations to predict the presence of a link between the nodes, rather than modeling the link representation directly. Before the deep learning era, it was demonstrated that utilizing standard linkage scores (e.g., Common Neighbors, Preferential Attachment, or Katz Index) outperforms vanilla user-based and item-based collaborative filtering on a book recommendation task. It has also been shown that standard linkage scores are particularly more effective than CF on large-scale user-generated content, like YouTube and Flickr.

Recently, the notion of using GNNs for link prediction has been challenged since its message-passing nature would lead to the same link representations for non-isomorphic links in the graph. To resolve this, a labeling trick has been used to improve the link representation learning for link prediction, rather than just aggregating from two learned node representations.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which:

FIG. 1 is an illustration depicting a linkage score $\hat{y}(u|i)$ based on the observed $u_1 \leftrightarrow i_1 \leftrightarrow u_2 \leftrightarrow i_2$ path in a sample configuration.

DETAILED DESCRIPTION

Figure 2:
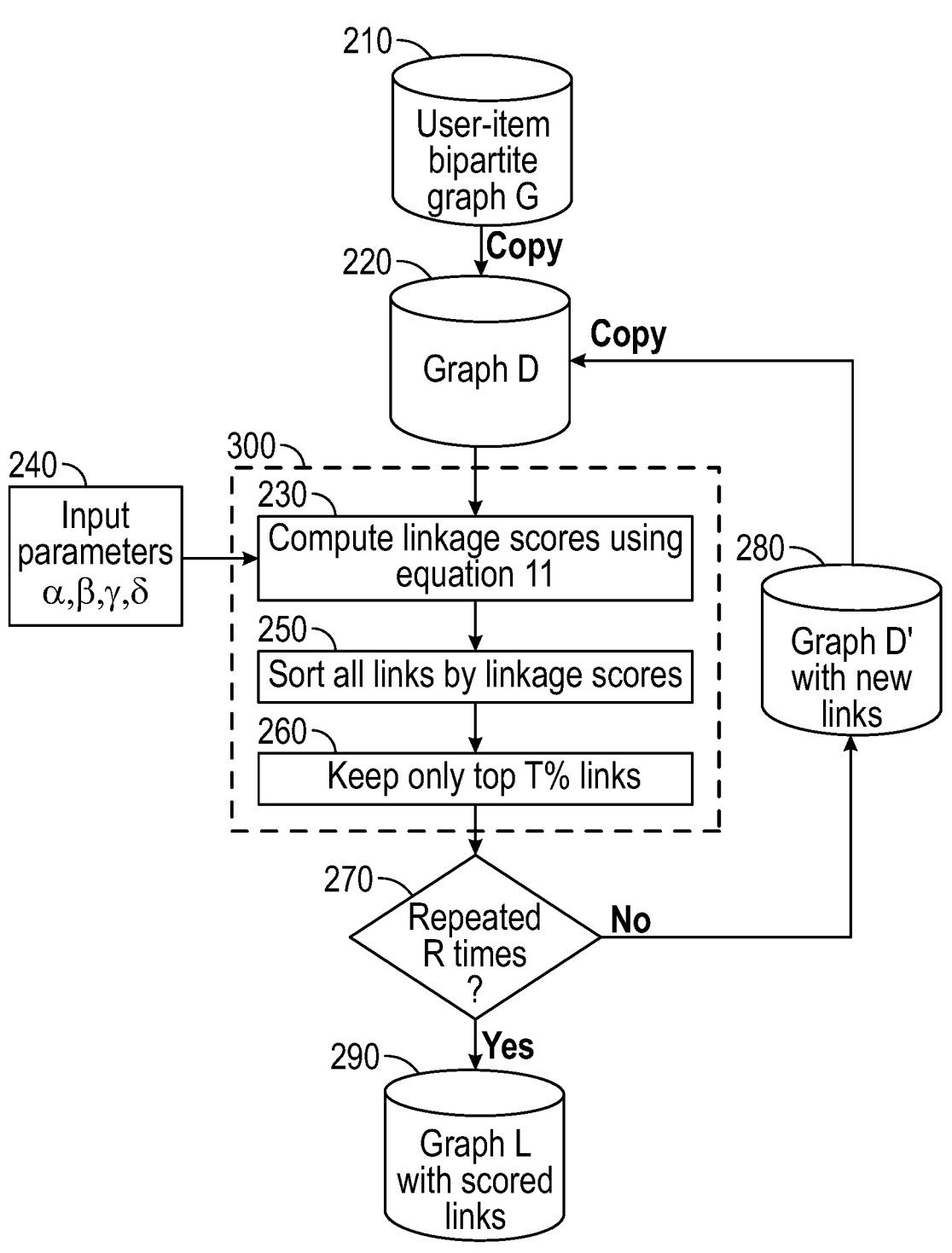
FIG. 2 is a flowchart illustrating a method for recommending items using a linkage score algorithm in a sample configuration.

A linkage (connectivity) score learning algorithm for bipartite graphs is described that generalizes multiple standard link prediction methods such as Common Neighbors, Salton Cosine Similarity, and the Leicht-Holme-Nerman Index. The linkage score learning algorithm is combined with a lightweight iterative degree update process in the user-item interaction bipartite graph to exploit local graph structures without any node (user/item) modeling. The result is a non-deep link prediction model with six learnable parameters. The linkage score learning algorithm predicts a set of linkage scores that can be used for recommendation systems and other link prediction tasks used to solve any problem that can be formulated as a link prediction task. The linkage score learning algorithm addresses the problem of link prediction by predicting new links (e.g., missing addresses) in a graph that do not already exist in training data. The link prediction aspect of collaborative filtering as described herein provides significant performance gains by aligning link prediction with item recommendations.

Figure 1:
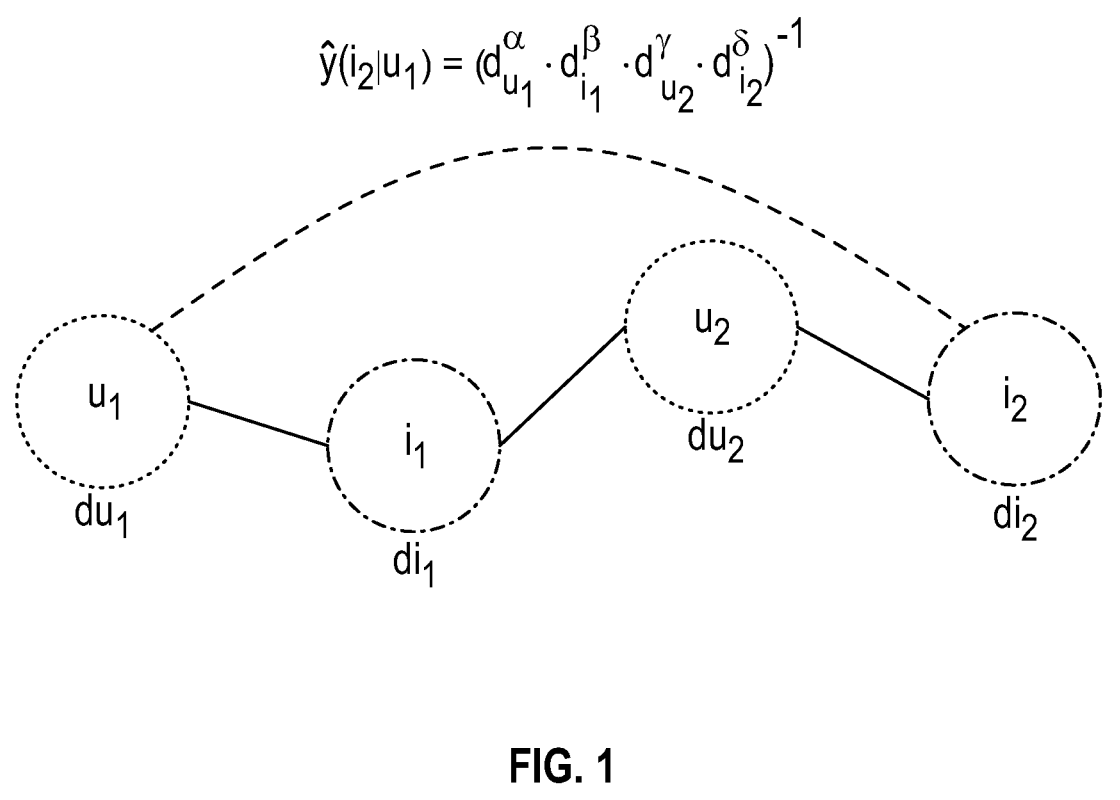

While it can be used in any other link prediction problems, the linkage score learning algorithm is described for use in a recommendation system. As will be explained below, the linkage score learning algorithm predicts a linkage score for each user-item pair, where u denotes a user and i denotes an item. In the linkage score learning algorithm, for user u1 and item i2, the predicted linkage score between them is the sum over all sub-scores of each 3-step linkage path between u1 and i2. For instance, in FIG. 1, u1 ? i1 ? u2

? i2 is a 3-step linkage path between u1 and i2, where ? denotes a link without weight and direction. The sub-score of this 3-step linkage path is calculated as $(d\_u1^{\alpha} \cdot d\_i1^{\beta} \cdot d\_u2^{\gamma} \cdot d\_i2^{?})^{-1}$, where d_i1 denotes the degree (number of links) of i1, d_u1 denotes the degree (number of links) of u1, d_i2 denotes the degree (number of links) of i2, d_u2 denotes the degree (number of links) of u2, and where $\alpha$, $\beta$, and $\gamma$ are learnable constants. The linkage score learning algorithm includes iterative degree updates, where the degrees used in the scoring formula are updated several times.

In a sample configuration, the linkage score learning algorithm conducts r cycles of calculation, where a cycle includes 3 steps: 1) calculate linkage scores, 2) add top t proportion of new links with highest linkage scores to the bipartite graph, and 3) update degrees of each user and item. t and r are learnable parameters as are $\alpha$, $\beta$, $\gamma$, and ?, which means that the optimal values for these parameters is dependent on the training data being considered. The optimal set of values for $\alpha$, $\beta$, $\gamma$, ?, t, and r is the one that achieves the best performance on validating data on some metrics. The linkage score learning algorithm pre-defines candidate values for each parameter and selects the best combination of them. Since the linkage score learning algorithm is robust to interaction noise commonly seen in real-world data, the algorithm may be readily used in an industrial setting.

A method of recommending items to users using a user-item bipartite graph in a sample configuration includes the steps of computing linkage scores from the user-item bipartite graph to weigh propagated links between respective nodes of the user-item bipartite graph from a user u to an item i to be searched as inversely proportional to a number of nodes of the user-item bipartite graph connecting the user u to the item i. The propagated links in the user-item bipartite graph are then sorted by linkage scores, and a top predetermined percent of new propagated links with highest linkage scores are added to the user-item bipartite graph to obtain an updated user-item bipartite graph. The steps of computing linkage scores, sorting the propagated links, and adding the new propagated links are repeated using the updated user-item bipartite graph to obtain a final recommendation search matrix, and a search is performed for at least one item to recommend to the user using the final recommendation search matrix.

In sample configurations, computing linkage scores from the user-item bipartite graph includes preprocessing the user-item bipartite graph to obtain a node degrees set P including a number of nodes of the user-item bipartite graph and every path of length 3 between user-item pairs ((u,i) pairs). Computing linkage scores from the user-item bipartite graph includes using the node degrees for every path of length 3 between the user-item pairs from set P and accumulating the computed linkage scores. The linkage score for all user-item pairs of length 3 is then computed as a function of (1) a node degree d of respective nodes of the user-item bipartite graph of respective paths of length 3 between each user and item and (2) learnable input parameters that may be optimized using a training algorithm.

In the sample configurations, computing linkage scores from the user-item bipartite graph further may include computing the linkage score $\hat{y}$ for all user-item pairs of length 3 as:

$$\hat{y}(i_2|u1) = \sum_{(ix,ux)\in P(u1,i2)} \left(d_{u1}^{a} \cdot d_{ix}^{\beta} \cdot d_{ux}^{\gamma} \cdot d_{i2}^{\delta}\right)^{-1}$$

for intermediate nodes $i_x$ and $u_x$ between user node $u_1$ and item node $i_2$ in the user-item bipartite graph, where $\alpha$, $\beta$, $\gamma$, $\delta$ are the learnable input parameters. The method may also include computing the final recommendation search matrix L as:

$$L = (D_{\alpha,\beta} \odot M)M^{T}(M \odot D_{\gamma,\delta})$$

where $\odot$ indicates a Hadamard product, $D_{\alpha,\beta}$ is a matrix version of $$d_{u1}^{a} \cdot d_{ix}^{\beta}, D_{\gamma,\delta}$$

is a matrix version of $$d_{ux}^{\gamma} \cdot d_{i2}^{\delta},$$

a number of paths of length 3 between a node u and i is given by $[(MM^{T})M]_{ui}$ where $M^{T}$ is a transpose of matrix M, and $L_{j,k}=\hat{y}(i_k|u_j)$ for respective items $i_k$ and respective users $u_j$.

A detailed description of a recommendation system implementing the linkage score learning algorithm will now be described with reference to FIGS. 1-6. Although this description provides a detailed description of possible implementations, it should be noted that these details are intended to be exemplary and in no way delimit the scope of the inventive subject matter.

The task addressed by the present disclosure is recommending items through Collaborative Filtering (CF) with implicit feedback. The feedback is implicit because it captures user behaviors (e.g., purchases and clicks), which implicitly indicates a user's interests, and is represented as the user-item interaction data. For every user, there exists at most one unique binary interaction with every item, and repeated interactions are ignored. Formally, let U and I be the sets of users and items, respectively, and let O be the observed interactions between some u∈ U and i∈ I. A binary interaction matrix $M \in B^{|U| \times |I|}$ may be defined such that:

$$M_{jk} = 1 \text{ if } (u_j, i_k) \in O \text{ and } M_{jk} = 0 \text{ otherwise.} \quad (1)$$

The goal of the recommendation system described herein is to exploit information from M to learn a scoring function $\hat{y}(u,i)$ that reflects the preference of a user u∈ U for an item i∈ I.

$$\hat{y}(u, i) = \hat{y}(i|u), \hat{y}:U \times I \to \mathbb{R} \quad (2)$$

The scoring function $\hat{y}(u,i)$ is then used to sort the list of unseen items {i∈ I|(u,i)∉ O} for a given user u. The ranking of the top k items per user can be evaluated through various metrics. In a sample configuration, the ranking may be evaluated by averaging using the metrics Recall@k and Normalized Discounted Cumulative Gain (NDCG@k) across all users.

While the interaction data may be represented as a matrix M (Equation (1)), the interaction data may also be represented as a bipartite graph:

$$G = (U, I, O), \quad (3)$$

in which U and I are two disjoint sets of nodes, and O is the set of undirected and unweighted edges connecting nodes in U to nodes in I. This formulation will be used below for link prediction based CF models.

The adjacency matrix A for a bipartite graph takes the form:

$$A = \begin{bmatrix} 0 & M \\ M^T & 0 \end{bmatrix} \quad (4)$$

where $M^T$ is the transpose of matrix M. To count the number of paths between nodes in $u \in U$ and $i \in I$, A can be raised to an odd power:

$$A^{2k+1} = \begin{bmatrix} 0 & (MM^T)^k M \\ (M^TM)^k M^T & 0 \end{bmatrix} \quad (5)$$

From Equation (5), it can be seen that the number of paths of length 2k+1 between a node u and i is given by:

$$\left[ (MM^T)^k M \right]_{ui} \quad (6)$$

Let $\Gamma(u_i)$ be the set of neighbors for a user $u_i \in U$, then $\Gamma(u_i) \cap u_j = \emptyset$ for any $u_j \in U$, since the graph is bipartite so that $\Gamma(u_i) \subseteq I$. Likewise, $\Gamma(u) \cap \Gamma(i) = \emptyset$ for any $u \in U$ and $i \in I$. The neighbors of u's neighbors can be defined as $\hat{\Gamma}(u) = \Gamma(\Gamma(u))$. Therefore, $\hat{\Gamma}(u) \subseteq U$ and $\hat{\Gamma}(u) \cap \Gamma(i) | \geq 0$. The same terms and statements apply to items in I.

Classic linkage scores are used to measure the likelihood that a link should be formed between two nodes in a graph. Augmented versions of these classic scores are described herein that can be applied to bipartite graphs.

The recommendation system described herein is interested in predicting links between nodes $u \in U$ and $i \in I$. A common term in the standard versions of the following scores is $|\Gamma(u) \cap \Gamma(i)|$, where $|\Gamma(u) \cap \Gamma(i)|$ can be viewed as measuring the number of common neighbors, or equivalently, the number of length two paths between the two nodes. However, as described above, the two sets of nodes, neighbors of u and neighbors of i, will always form the empty set under intersection. Therefore, the term may be adjusted to be $|\Gamma(u) \cap \hat{\Gamma}(i)|$, which is the number of paths of length three between the two nodes. Let P(u,i) be the set of (item, user) tuples that connect u to i in the bipartite graph, i.e., $P(u,i) = \{(i_x, u_x) : (u, i_x) \in O \wedge (u_x, i_x) \in O \wedge (u_x, i) \in O\}$.

The Common Neighbors (CN) score is widely used for link prediction due to its simplicity and effectiveness. The standard version of CN measures the number of nodes that two nodes have both interacted with (in other words, the number of paths of length two between two nodes). Therefore, in the bipartite version of CN, the number of paths of length three is counted between two nodes. Thus, the score is:

$$CN(u, i) = |\Gamma(u) \cap \hat{\Gamma}(i)| = \sum_{(ix, ux) \in P(u,i)} 1 = |P(u, i)| \quad (7)$$

The Salton Cosine Similarity (SC) measures the cosine similarity between two nodes u and i:

$$SC(u, i) = (|\Gamma(u) \cap \hat{\Gamma}(i)|) / (\sqrt{|\Gamma(u)| \cdot |\Gamma(i)|}) = \sum_{(ix, ux) \in P(u,i)} 1 / (\sqrt{d_u \cdot d_i}) \quad (8)$$

Leicht-Holme-Nerman (LHN) is similar to SC without the square root in the denominator and thus will shrink the score of high degree nodes more quickly. LHN is represented as:

$$LHN(u, i) = (|\Gamma(u) \cap \hat{\Gamma}(i)|) / (|\Gamma(u)| \cdot |\Gamma(i)|) = \sum_{(ix, ux) \in P(u,i)} 1 / (d_u \cdot d_i) \quad (9)$$

Parameter-Dependent (PD) includes an adjustable parameter λ to recover the previous three linkage scores. Specifically, with λ=0, CN may be recovered using Equation (7), and with λ=0.5, SC may be recovered using Equation (8). With λ=1, LHN may be recovered using Equation (9).

$$PD(u, i) = (|\Gamma(u) \cap \hat{\Gamma}(i)|) / ((|\Gamma(u)| \cdot |\Gamma(i)|)^{\lambda}) = \sum_{(ix, ux) \in P(u,i)} 1 / (d_u \cdot d_i)^{\lambda} \quad (10)$$

Label propagation is an established approach for semi-supervised learning in graphs, particularly for node classification. At its core, it assumes the presence of homophily in the graph, where similar nodes tend to be connected together. The main goal is then to predict which class unlabeled nodes belong to, by propagating information from labeled nodes.

The approach described herein is closely related to label propagation in that information is similarly propagated from existing labeled data to unlabeled data, but with a core difference: the focus is on links, and not nodes. There are no labels to assign to links, but rather the goal is to compute the strength (score) of a potential link. Intuitively, this makes sense since the task of recommending items to users is inherently a link prediction one. The actual label assigned to users and items is secondary, and the recommendation system is most concerned about whether there can be a link or interaction between a user and item. FIG. 1 is an illustration depicting a linkage score $\hat{y}(u_2|i_1)$ between a user and item based on the observed $u_i \leftrightarrow i_1 \leftrightarrow u_2 \leftrightarrow i_2$ path in a sample configuration.

Proposed link propagation methods LINKPROP and LINKPROP-MULTI will now be described. LINKPROP exploits the user-item interaction graph to produce (soft) propagated links. How the linkage scores are computed for the predicted links will be described. Next, LINKPROP-MULTI will be described, which improves upon LINKPROP by performing multiple iterations. The proposed training algorithm also will be described.

As noted above, the goal of the recommendation system described herein is to find highly possible connections between users and items in the interaction graph. The naive approach is to propagate links from existing, observed connections, such that a link is formed between a user u and an item i if the nodes are connected through an existing path in the interaction graph. For example, a link propagation could happen as follows for some $u_i, \ldots, u_k$ and $i_1, \ldots, i_k$: $u_1 \leftrightarrow i_1 \leftrightarrow u_2 \leftrightarrow i_2 \leftrightarrow \ldots \leftrightarrow u_k \leftrightarrow i_k$, where a link is denoted by $(\bullet)\leftrightarrow(\bullet)$. That is, a direct link is made directly between $u_1$ and $i_k$ from a path through their neighbors.

As mentioned above, any path connecting a user $u$ to an item $i$ will have length $2k+1$. In the present method, the shortest valid path of length three is considered for the following reasons. First, LightGCN shows aggregating node embeddings from within three hops is effective and is the setting they use in their main experiments. Second, by using the same path length constraint as LightGCN, a fairer comparison to their method may be provided. Finally, if two nodes do not have any overlap in their local neighborhood even after a few hops, it is unlikely that they would share similar item preferences.

It is overly simplistic to assume that every propagated link should have equal weight. Thus, the next step is to formulate a linkage score function $\hat{y}$ to weigh a propagated link $u_1 \leftrightarrow i_2$. The propagated link is weighted inversely proportional to the degree of the nodes along the path connecting $u_1$ to $i_2$. Specifically, the link is scored with the following equation:

$$\hat{y}(i_2 \mid u_1) \sum_{(ix,ux) \in P(u1,i2)} \left(d_{u1}^{\alpha} \cdot d_{ix}^{\beta} \cdot d_{ux}^{\gamma} \cdot d_{i2}^{\delta}\right)^{-1} \qquad (11)$$

where $P(u_1,i_2) = \{(i_x, u_x): (u_1, i_x) \in O \land (u_x, i_x) \in O \land (u_x, i_2) \in O\}$, $d_{(\bullet)}$ is the node degree, and $\alpha$, $\beta$, $\gamma$, $\delta$ are learnable parameters.

The scoring function attempts to weigh the likelihood of a link between any user-item based on the connectivity of the three-hops paths between them. Nodes on the path that are highly connected would have a high degree, which leads to a lower link weight, and vice-versa. This is similar to the heuristic for term frequency-inverse document frequency (TF-IDF), where terms that appear in many documents tend to be less informative. Analogously, suppose for some $u_1 \leftrightarrow i_1 \leftrightarrow u_2 \leftrightarrow i_2$ interaction where some user $u_1$ and a low degree user $u_2$ enjoy the same obscure and low degree item $i_1$. Recommending user $u_1$ with some item $i_2$ that $u_2$ has also interacted with could prove to be informative due to its rarity, and a greater label weight may be assigned to the $u_1 \leftrightarrow i_2$ link accordingly.

From the proposed linkage score function in Equation (11), connections may be drawn to several standard neighborhood-based link prediction score functions introduced above by setting the parameters to specific values as follows:

Common Neighbors (CN): $\alpha=\beta=\gamma=\delta=0$
Salton Cosine Similarity (SC): $\alpha=\delta=0.5$, $\beta=\gamma=0$
Leicht-Holme-Nerman (LHN): $\alpha=\delta=1$, $\beta=\gamma=0$
Parameter Dependent (PD): $\alpha=\delta=\lambda$, $\beta=\gamma=0$ Thus, the model is able to learn the optimal values for $\alpha$, $\beta$, $\gamma$, $\delta$ which is more powerful and general than any one of these scoring functions. As shown below, making all of these parameters learnable leads to a strong performance of the recommendation system.

The scoring function may be further simplified by noting that during evaluation, for each user, the score will be scaled by the same factor $d_{u1}^{\alpha}$, i.e.:

$$\hat{y}(i_2 \mid u_1) \propto \sum_{(ix,ux) \in P(u1,i2)} \left(d_{ix}^{\beta} \cdot d_{ux}^{\gamma} \cdot d_{i2}^{\delta}\right)^{-1} \qquad (12)$$

This is the final form of the scoring function for LINKPROP, which defines a continuous parameter space formed from $\beta$, $\gamma$ and $\delta$ alone, which are the three learnable parameters of LINKPROP.

Next, the matrix version of LINKPROP may be derived as follows. Let $d_{ui}$ be the degree of user $u_i$ and $d_U \in \mathbb{R}^{|U|}$ be the vector of degrees for nodes in $U$ where $[d_U]_i = d_{ui}$ and likewise for $d_I \in \mathbb{R}^{|I|}$. Let $d^{\alpha}_U$ be the vector of degrees raised to $\alpha$ power, where $[d^{\alpha}_U]_i = d^{\alpha}_{Ui}$ as follows:

$$D_{\alpha,\beta} = d_U^{-\alpha} \cdot \left(d_I^{-\beta}\right)^T \qquad (13)$$

$$D_{\gamma,\delta} = d_U^{-\gamma} \cdot \left(d_I^{-\delta}\right)^T \qquad (14)$$

Equation (6) above may be used for computing the number of odd path lengths in a bipartite graph, which is $MM^T M$ for paths of length three. From here, the final matrix version of LINKPROP may be obtained as follows:

$$L = (D_{\alpha,\beta} \odot M)M^T(M \odot D_{\gamma,\delta}) \qquad (15)$$

where $\odot$ indicates the Hadamard product, and $L_{j,k}=\hat{y}(i_k \mid u_j)$ as desired. The Numpy code for this method is shown in Algorithm 1 below:

---

Algorithm 1 LINKPROP: Numpy Pseudocode

```
# user_degrees: np array shape (U,) containing user degrees
# item_degrees: np array shape (I,) containing item degrees
# M: np array shape (U, I) containing interactions
# alpha, beta, gamma, delta: \outname( ) model parameters
# exponentiate degrees by model params
user_alpha = user_degrees**(-alpha)
item_beta = item_degrees**(-beta)
user_gamma = user_degrees**(-gamma)
item_delta = item_degrees**(-delta)
# outer products
alpha_beta = user_alpha.reshape((-1, 1)) * item_beta
gamma_delta = user_gamma.reshape((-1, 1)) * item_delta
# hadamard products
M_alpha_beta = M * alpha_beta
M_gamma_delta = M * gamma_delta
L = M_alpha_beta.dot(M.T).dot(M_gamma_delta)
```

---

Notes: dot is matrix multiplication. M.T is M's ranspose.

The LINKPROP-MULTI model leverages updated user/item degree values after an iteration of link propagation. It is supposed that an iteration of link propagation has been performed. Let $L^{(1)}$ be the link propagated interaction matrix from Equation (15), which contains both the observed and propagated links between users and items. The observed links from $L^{(1)}$ are first masked out and the propagated links are sorted based upon their score $\hat{y}$. Links are then discarded that are not in the top $t$ proportion of links. For example, if 100 links are propagated and $t$ is set to 0.05, then the five highest scoring links will be retained. The remaining links are added to the original interaction matrix and the user/item degree values are recomputed. Then the updated user/item degree values and the original interaction matrix are used as inputs to the next iteration of link propagation. Doing so, the computation of $L^{(1)}$ for $r-1$ more iterations may be repeated to obtain the final propagated matrix $L^{(r)}$.

However, it will be appreciated that this multiple iteration mechanism, $d_{ui}$ now influences the propagated scores since link scores are being sorted across users, which means that $d^{\alpha}_{u1}$ is re-introduced in the computation of L. Thus, in total for this model variant, $t$, $r$, $\alpha$ are three new parameters that can be learned, resulting in six learnable parameters in total. For comparison, the model with $r=1$ is referred to as LINKPROP, and those with more than one propagation step are referred to as LINKPROP-MULTI.

FIG. 2 is a flowchart illustrating a method 200 for recommending items using a linkage score algorithm 300 (FIG. 3) in a sample configuration.

As illustrated in FIG. 2, the method 200 starts with a user-item bipartite graph G at 210. A copy of the bipartite graph G is created as Graph D for processing at 220. The method 200 then implements the linkage score algorithm 300 (FIG. 3) at 230 by computing linkage scores using Equation (11) and input parameters $\alpha$, $\beta$, $\gamma$, $\delta$ provided at 240. The links in the Graph D are sorted by linkage scores at 250, and the top T percent of new links with the highest linkage scores are kept at 260 to be added to Graph D.

As noted above, the linkage score algorithm 300 is repeated (e.g., R times) to obtain the final recommendation search matrix. If it is determined at 270 that the linkage score algorithm 300 has not been repeated R times, the Graph D is updated to graph D' with new links at 280, and the linkage score algorithm 300 is repeated for graph D' at 220. Once it is determined at 270 that the linkage score algorithm 300 has been repeated R times, the final matrix (Graph L) with scored links is obtained at 290. Graph L may then be used for recommendations of items for the user in a recommendation system.

Figure 3:
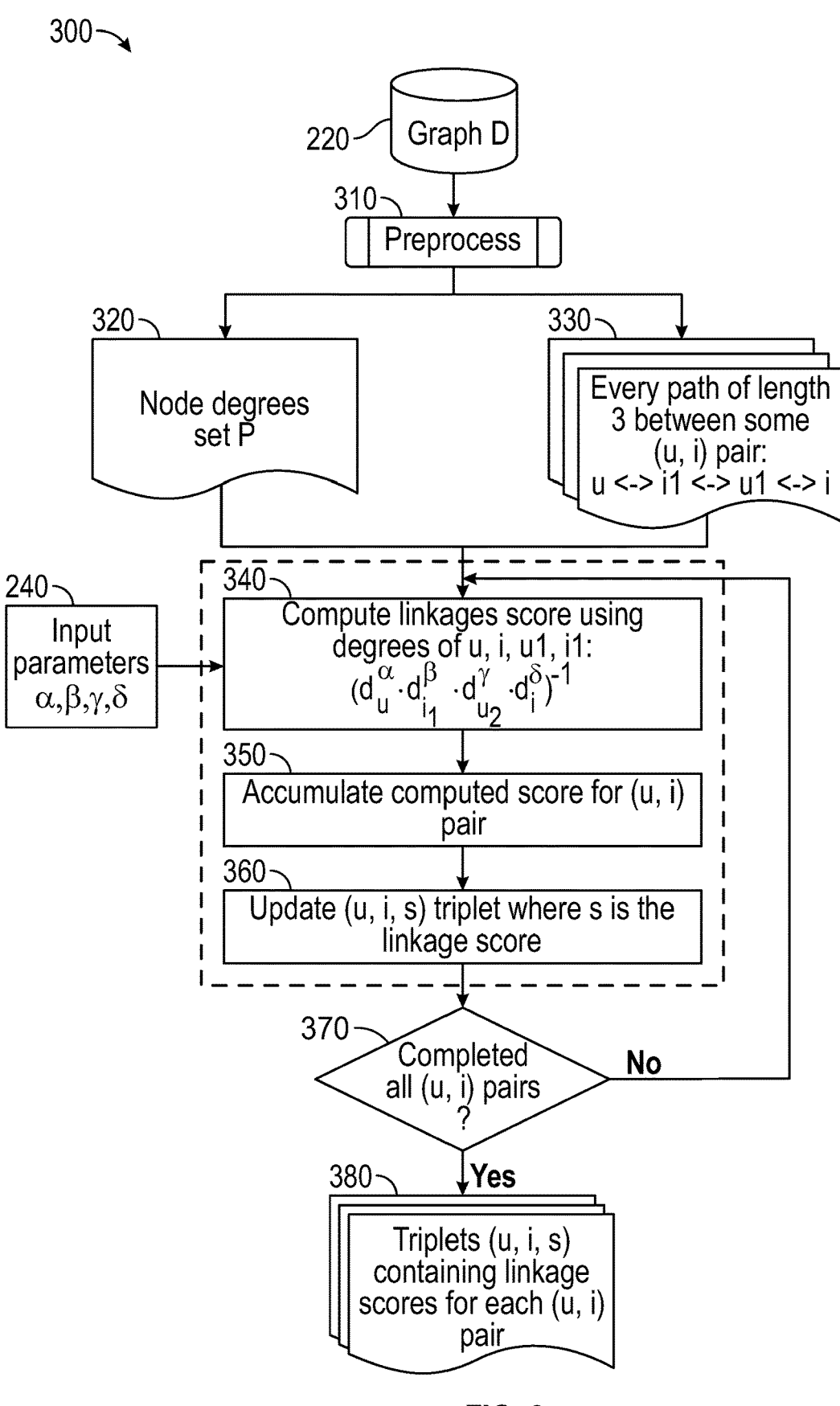
FIG. 3 is a flowchart depicting a sample configuration of a linkage score learning algorithm for use in the method of FIG. 2.
Figure 4A:
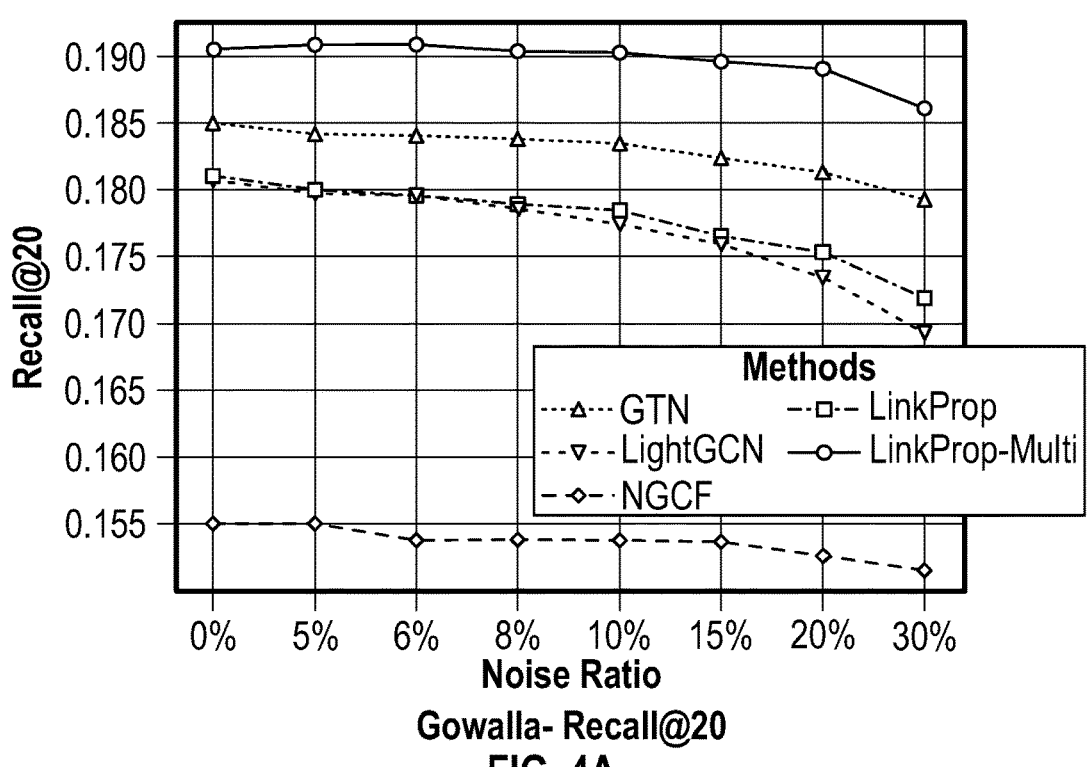
FIGS. 4A, 4B, 4C, 4D, 4E, 4F, 4G, and 4H are illustrations depicting NDCG@20 and Recall@20 metrics across different noise ratios perturbing the interaction graph.
Figure 4B:
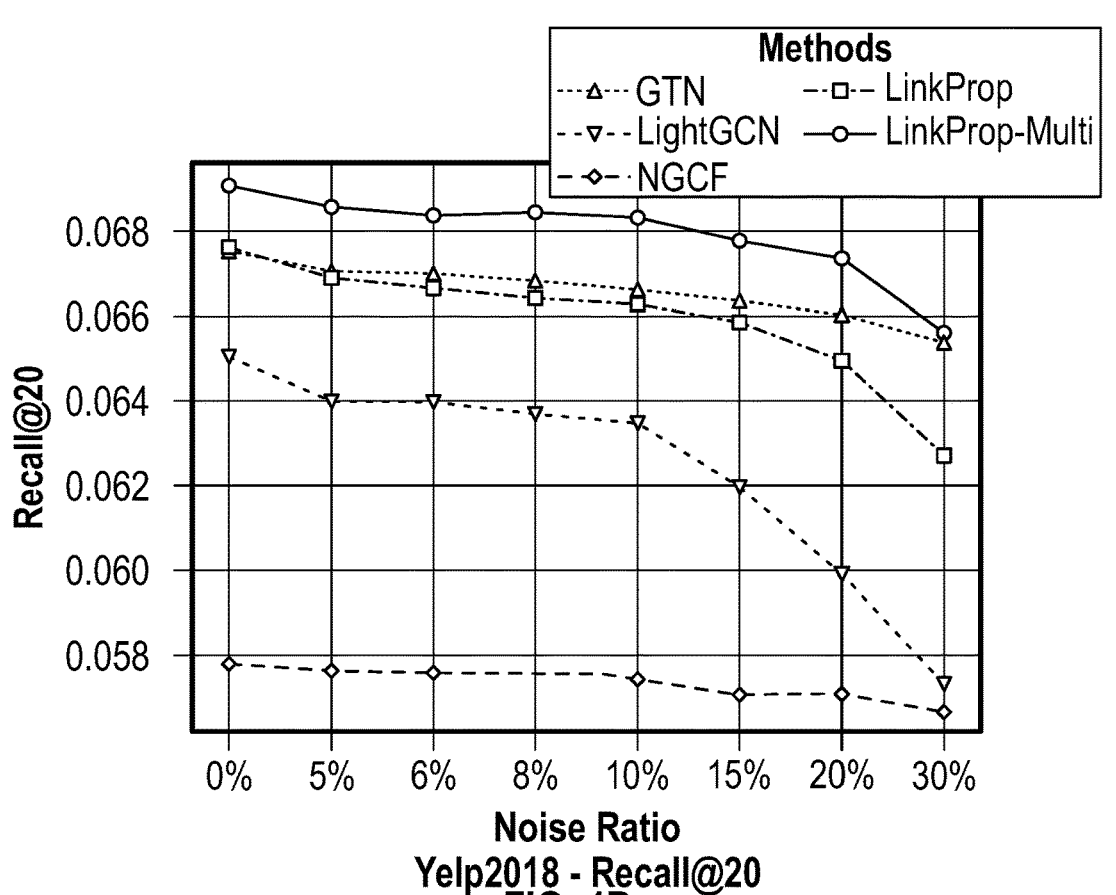
Figures 4C, 4D:
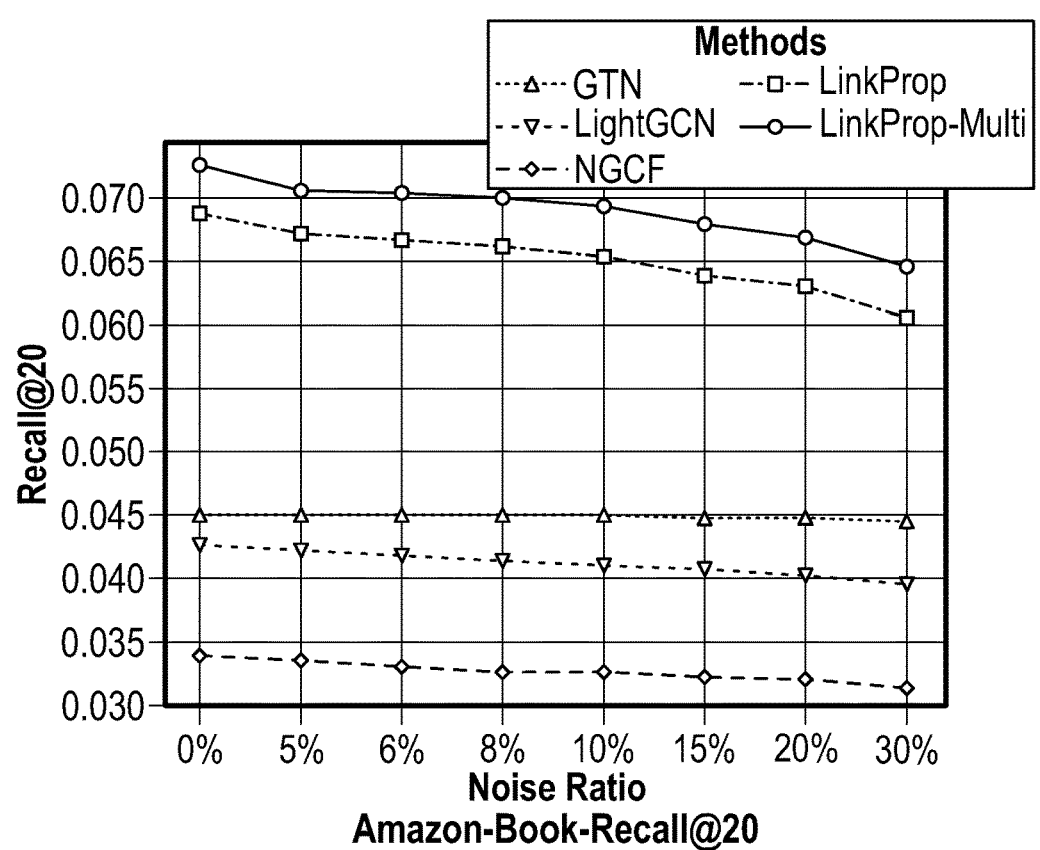
Figure 4E:
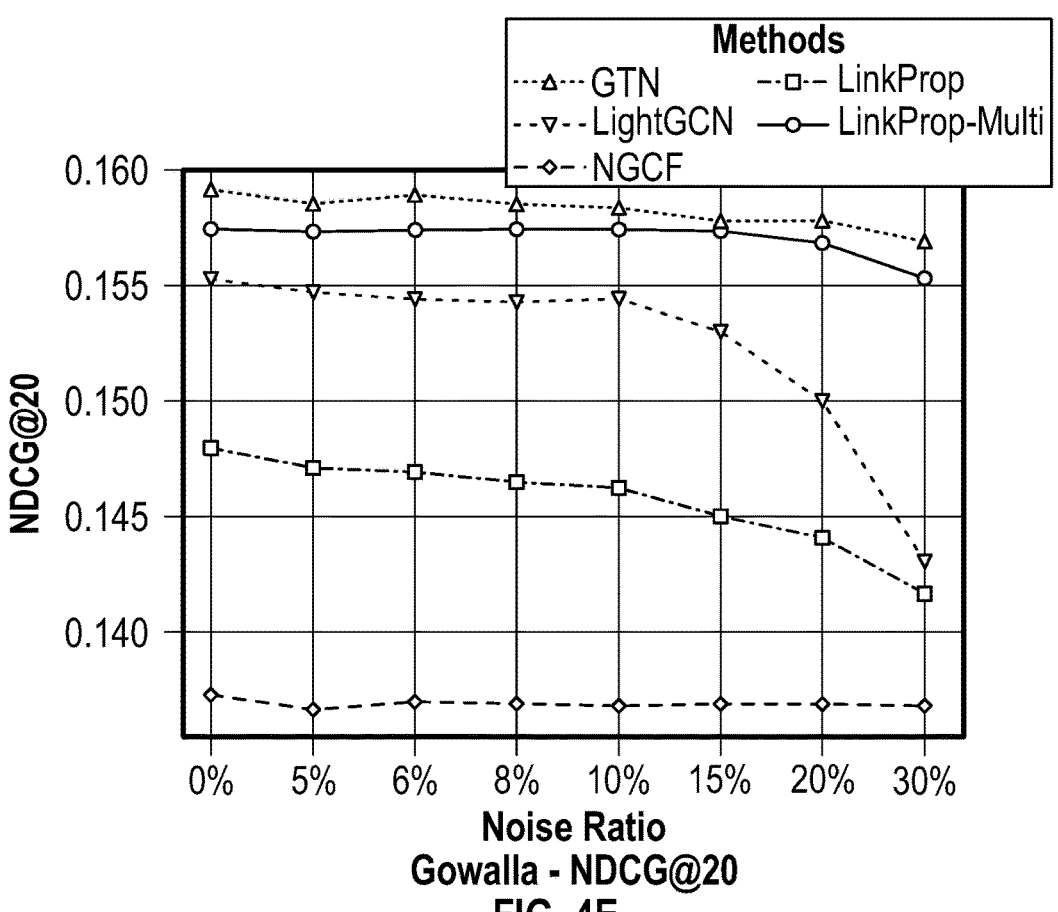
Figure 4F:
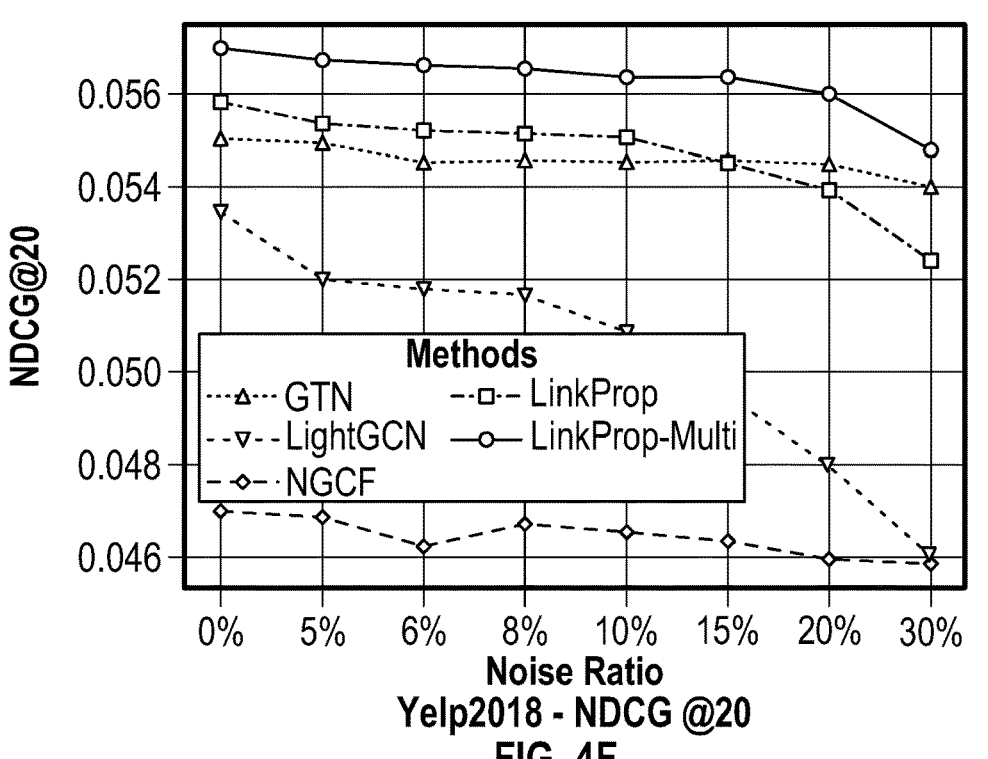
Figure 4G:
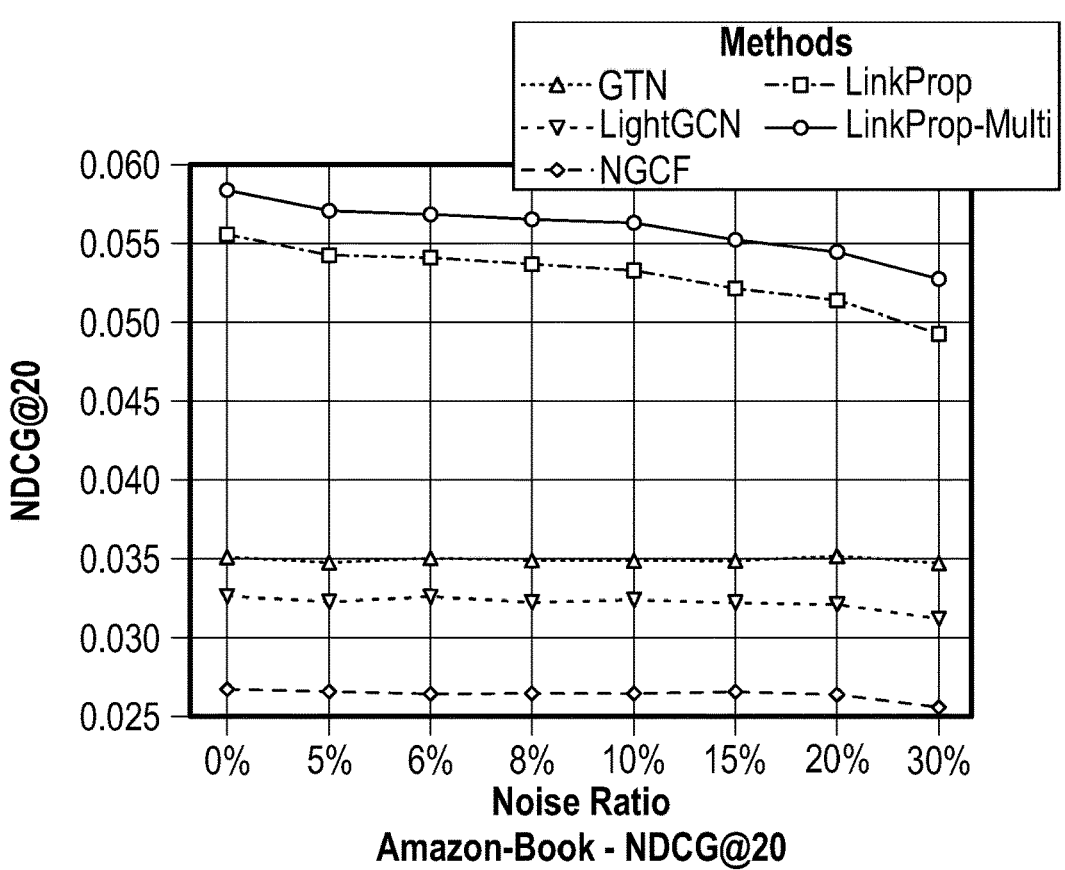
Figure 4H:
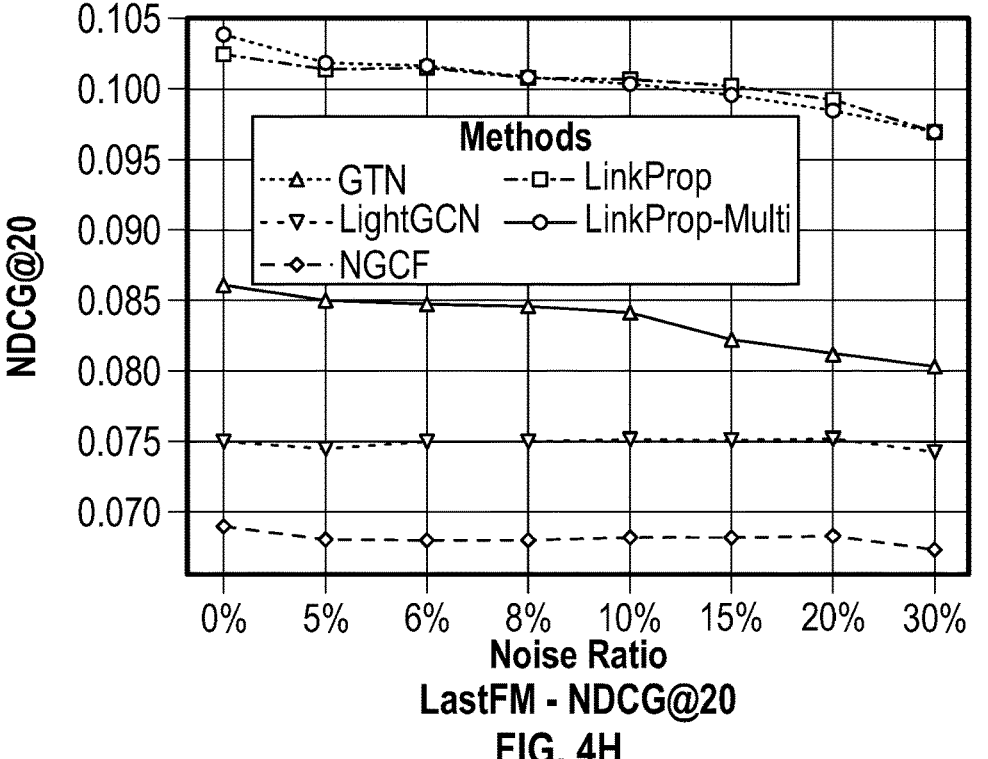

FIG. 3 is a flowchart depicting a sample configuration of a linkage score learning algorithm 300 for use in the method of FIG. 2.

As illustrated in FIG. 3, the linkage score learning algorithm 300 starts with Graph D (220) and preprocesses the Graph D at 310 to obtain the node degrees set P at 320 and every path of length 3 between user-item pairs ((u,i) pairs) $u \leftrightarrow i_1 \leftrightarrow u_1 \leftrightarrow i$ at 330. The linkage score is computed using the degrees of u, i, $u_1$, and $i_1$ at 340 using Equation (11) and input parameters $\alpha$, $\beta$, $\gamma$, $\delta$ provided at 240. The computed linkage score s for the (u,i) pair is accumulated at 350, and the (u,i,s) triplet is updated at 360.

The linkage score computation is repeated for all (u,i) pairs until it is determined at 370 that all (u,i) pairs have been processed. The triplets (u,i,s) containing the linkage scores for each (u,i) pair is provided at 380. As noted above with respect to FIG. 2, the linkage scores for each (u,i) pair may be sorted and used to provide a final matrix for use by the recommendation system.

Those skilled in the art will further appreciate that given a continuous hypothesis set, regular gradient descent based optimization techniques may be used to find the optimal parameter combinations for the six learnable parameters. However, this typically requires a loss function (e.g. the BPR loss used in LightGCN), which acts as at most a proxy for the final evaluation metric to be found. Furthermore, the optimal metric is dependent upon the overall recommendation system. For example, if the model is used during the retrieval stage rather than the ranking stage in a two-stage recommendation system, then Recall could be a more appropriate metric compared to NDCG, as it does not consider the ordering of the retrieved items. The model described herein is directly optimized for NDCG without a proxy loss function. Since NDCG is non-differentiable, the parameter space is quantized and a coarse grid search for the optimal parameters is performed. This is feasible because the model contains few parameters and a small search space may be used for each parameter.

The time complexities of model training for both LinkProp and LightGCN will now be analyzed and compared. Consider a dataset with u users, i items, and/links, where $O(u) \approx O(i)$ and $O(l) \approx O(u^{1.5}) \approx O(i^{1.5})$.

During training of LinkProp, g inferences are run to complete a grid search for the best parameters. The dominating operation in terms of time complexity is calculating $MM^TM$, where matrix M is a u×i matrix with l non-zero values. With the sparse matrix M stored in the Compressed Sparse Row (CSR) format, calculating $MM^TM$ takes $O(l \cdot \min(u,i))$ time, where the selection between u and i is determined by calculating $MM^T$ or $M^TM$ first. Repeating this g times, the total time complexity of training LinkProp is $O(gl \cdot \min(u,i))$. Considering the assumptions for the relations between $O(u)$, $O(i)$, and $O(l)$, $O(gl \cdot \min(u,i)) \approx O(gu^{2.5})$.

For training a LightGCN model, it is assumed that the LightGCN model consists of L Light Graph Convolutional layers and learns d dimensional representations. Also, the model is trained for e epochs with batch size b. Knowing that there are l training samples with the BPR loss, there are l/b batches in an epoch. Consequently, the total number of training steps is $e \cdot l/b$. For each training step, Light Graph Convolution with $O(ld)$ time complexity is conducted L times, leading to a total complexity of $O(Lld)$. Combining all training steps, the overall time complexity of training a LightGCN model is $O(l^2Lde/b)$. Again, $O(l^2Lde/b) \approx O(u^3Lde/b)$.

Among all the factors, the total number of users, u, is significantly larger than any other variables in scale, and thus dominates the complexity. As a result, the training time complexity of LinkProp is $O(gu^{2.5}) \approx O(u^{2.5})$, and that for LightGCN is $O(u^3Lde/b) \neq O(u^3)$.

LightGCN tries to match the compatibility of some user and item via their learned node embeddings, followed by weighing this score proportionally to their (intermediate) node degrees. However, since item recommendations are intrinsically a link prediction task, the biggest source of information could be obtained from the score weights for the potential link between two unconnected nodes, which can be further generalized to the proposed link propagation score $\hat{y}$. If so, learning the exact node embeddings is secondary, and may be unnecessarily complicated as model training may not even converge perfectly. In fact, the general approach of learning node embeddings before computing the similarity between two embeddings could be seen as an approximation of a link between two nodes. Rather than taking this indirect approach, the recommendation method described herein computes the link directly.

The settings used for conducting fair and reproducible experiments will now be explained as well as the efficacy of the disclosed method against prior art techniques. Ablation studies will be described to understand the sources of improvements, and the proposed linkage score function will be compared to existing standard linkage scores. It will also be shown how the disclosed method is robust to varying levels of interaction noise that could be seen in real-world data.

The models LinkProp and LinkProp-Multi were tested on four popular benchmark datasets: Gowalla, Yelp-2018, Amazon-book, and LastFM. Table 1 below illustrates statistics summarizing these datasets.

TABLE 1

Basic statistics of benchmark datasets.

| Datasets | User-Item Interaction | | | |
|---|---|---|---|---|
|  | #Users | #Items | #Interactions | Sparsity % |
| Gowalla | 29,858 | 40,981 | 1,027,370 | 99.92 |
| Yelp2018 | 31,668 | 38,048 | 1,561,406 | 99.87 |

TABLE 1-continued

Basic statistics of benchmark datasets.

| | User-Item Interaction | | | |
|---|---|---|---|---|
| Datasets | #Users | #Items | #Interactions | Sparsity % |
| Amazon-Book | 52,643 | 91,599 | 2,984,108 | 99.94 |
| LastFM | 23,566 | 48,123 | 3,034,763 | 99.73 |

For a fair comparison, the same preprocessed and split versions of these datasets is used as in previous GNN-based methods, and the same evaluation protocols and metrics are followed. Specifically, the setup in LightGCN is followed where items the user has not previously interacted with are candidates for ranking, and evaluation is measured by computing the average Recall@20 and NDCG@20 across all users.

To prevent overfitting to the test dataset, the optimal model parameters are searched for on a validation dataset, which is created by randomly sampling 10% of a user's interacted items from the training data. Since the datasets were preprocessed to include users with at least ten interacted items, there is at least one item in the validation dataset for every user.

Table 2 shows the set of model parameters (α, β, γ, δ, r, t) that are searched over when fitting the models. It can be seen that the total number of parameter and hyperparameter combinations searched is actually fairly small. For LINKPROP, a search is conducted over $|\beta|*|\gamma|*|\delta|=343$ combinations, and for LINKPROP-MULTI, a search is conducted over an additional $|\alpha|*|t|*|r|=168$ values, which brings the total number of settings searched to 511. It is noted that in LINKPROP-MULTI the optimal β, γ, δ is found and fixed before searching over the additional values needed for LINKPROP-MULTI.

TABLE 2

Parameter values searched.

| Parameter | Values Searched |
|---|---|
| α, β, γ, δ | 0.0, 0.17, 0.34, 0.5, 0.67, 0.84, 1.0 |
| r | 1, 2, 3, 4 |
| t | 0.05, 0.1, 0.2, 0.3, 0.5, 1.0 |

After the optimal model parameters on a validation dataset are found, inference is then performed using these settings from the observed links in the original training data. The models directly output a relevance score for every unseen user-item pair. The predicted relevance scores are used to rank the unseen items for each user and the rankings are compared to the test dataset. Table 3 shows the values learned by LinkProp and LinkProp-Multi on all four datasets.

TABLE 3

Learned Parameters.

| | | Parameters | | | | | |
|---|---|---|---|---|---|---|---|
| Method | Dataset | α | β | γ | δ | t | r |
| LINKPROP | Gowalla | — | 0.5 | 0.67 | 0.34 | — | — |
| | Yelp2018 | — | 0.67 | 0.5 | 0.5 | — | — |
| | Amazon-Book | — | 0.5 | 0.5 | 0.5 | — | — |
| | LastFM | — | 0.67 | 0.67 | 0.34 | — | — |
| LINKPROP-MULTI | Gowalla | 0.34 | 0.5 | 0.67 | 0.34 | 0.2 | 2 |
| | Yelp2018 | 0.34 | 0.67 | 0.5 | 0.5 | 0.05 | 3 |
| | Amazon-Book | 0.34 | 0.5 | 0.5 | 0.5 | 0.1 | 3 |
| | LastFM | 0.5 | 0.67 | 0.67 | 0.34 | 0.5 | 2 |

The main results comparing the described recommendation method to prior art methods are shown in Table 4 below. Despite the simplicity of the proposed models, LinkProp-Multi outperforms all other conventional models on both metrics on all four datasets, except for NDCG@20 on Gowalla where the method performs slightly worse than GTN. Even LinkProp, a simplified version with one propagation iteration and no entity degree update, outperforms the conventional models on three of the four datasets in terms of NDCG@20. This demonstrates the effectiveness of the described link propagation method over deep learning and classical MF methods.

TABLE 4

The comparison of overall performance.

| | Gowalla | | Yelp2018 | | Amazon-Book | | LastFM | |
|---|---|---|---|---|---|---|---|---|
| Datasets Metrics | Recall @20 | NDCG @20 | Recall @20 | NDCG @20 | Recall @20 | NDCG @20 | Recall @20 | NDCG @20 |
| MF | 0.1299 | 0.111 | 0.0436 | 0.0353 | 0.0252 | 0.0198 | 0.0725 | 0.0614 |
| NeuCF | 0.1406 | 0.1211 | 0.045 | 0.0364 | 0.0259 | 0.0202 | 0.0723 | 0.0637 |
| GC-MC | 0.1395 | 0.1204 | 0.0462 | 0.0379 | 0.0288 | 0.0224 | 0.0804 | 0.0736 |
| NGCF | 0.156 | 0.1324 | 0.0581 | 0.0475 | 0.0338 | 0.0266 | 0.0774 | 0.0693 |

TABLE 4-continued

The comparison of overall performance.

| Datasets Metrics | Gowalla | | Yelp2018 | | Amazon-Book | | LastFM | |
|---|---|---|---|---|---|---|---|---|
| | Recall @20 | NDCG @20 | Recall @20 | NDCG @20 | Recall @20 | NDCG @20 | Recall @20 | NDCG @20 |
| Multi-VAE | 0.1641 | 0.1335 | 0.0584 | 0.045 | 0.0407 | 0.0315 | 0.078 | 0.07 |
| DGCF | 0.1794 | 0.1521 | 0.064 | 0.0522 | 0.0399 | 0.0308 | 0.0794 | 0.0748 |
| LightGCN | 0.1823 | 0.1553 | 0.0649 | 0.0525 | 0.042 | 0.0327 | 0.085 | 0.076 |
| GTN | 0.187 | 0.1588 | 0.0679 | 0.0554 | 0.045 | 0.0346 | 0.0932 | 0.0857 |
| LINKPROP | 0.1814 | 0.1477 | 0.0676 | 0.0559 | 0.0684 | 0.0559 | 0.1054 | 0.1025 |
| LINKPROP-MULTI | 0.1908 | 0.1573 | 0.069 | 0.0571 | 0.0721 | 0.0588 | 0.1071 | 0.1039 |
| Rel. Improvement (%) | 2.03 | −0.94 | 1.62 | 3.07 | 60.22 | 69.94 | 14.91 | 21.24 |

It is noteworthy that the disclosed recommendation model outperforms the conventional models on the Amazon-book dataset by an extremely large margin. This is because the number of users, items, and interactions in the Amazon-book dataset is much larger than the other three datasets. With more users, consequently more ranking lists, and more items needed to be satisfied by the model, the fixed-dimension latent space of users and items in node embedding based models may lack representational powers as the number of users and items scale. For example, the latent space dimension is fixed to 64 for all node embedding models. This may be enough for a model to learn informative embeddings for entities in the smaller Gowalla and Yelp2018 datasets, but is insufficient for a dataset as large as Amazon-book. This means that for such models, as the number of users, items, and interactions increase, they not only have to create a longer embedding lookup table for the nodes, but also requires a wider one with higher dimensions. It is then a challenge to apply these models in the real-world, where the scale of data is much larger than the datasets used. For clarity, the performance of the disclosed model may be compared with a higher dimensional LightGCN, where the largest embedding dimensions without "out of memory" issue (16× larger) were used, which increases LightGCN's performance by 16.4% and 15.3% on recall and NDCG. Even in this case, LightGCN's performance is still far behind that of the described method (60.2% and 69.9% improvement).

In contrast, the disclosed model scales to growth in users/items much better. Without a need to explicitly learn a fixed dimension embedding for each entity, it is not limited by the representation power of the latent space. Accordingly, the need for tuning the latent space dimension and dealing with the usual difficulties associated with training a gradient based model has been removed. This in turn vastly reduces the computational cost to train the model, as noted above.

Table 5 shows the performance of LINKPROP when excluding parameters from the linkage score defined in Equation (11). In order to exclude parameters, the parameter value is fixed at zero. It is noted that for all the different parameter combinations, the recommendation system still searches for the optimal parameter values using the training and validation datasets.

TABLE 5

Ablation on learnable parameters for LINKPROP

| Learnable Parameter | Existing Standard | Metrics Recall@20/ NDCG@20 | | | |
|---|---|---|---|---|---|
| β γ δ | Linkage Score? | Gowalla | Yelp2018 | Amazon-Book | LastFM |
| 0 0 1 | Leicht-Holme-Nerman (LHN) | 0.0533/ 0.0360 | 0.0093/ 0.0075 | 0.0289/ 0.0219 | 0.0544/ 0.0432 |
| 0 0 0.5 | Salton Cosine Similarity (SC) | 0.1252/ 0.0950 | 0.0553/ 0.0461 | 0.0506/ 0.0413 | 0.0936/ 0.0922 |
| 0 0 0 | Common Neighbors (CN) | 0.1367/ 0.1142 | 0.0468/ 0.0385 | 0.0348/ 0.0278 | 0.0786/ 0.0752 |
| ✓ 0 0 | | 0.1597/ 0.1348 | 0.0513/ 0.0424 | 0.0403/ 0.0312 | 0.0904/ 0.0849 |
| 0 ✓ 0 | | 0.1548/ 0.1270 | 0.0496/ 0.0403 | 0.0440/ 0.0352 | 0.0845/ 0.0795 |
| 0 0 ✓ | Parameter-Dependent (PD) | 0.1397/ 0.1108 | 0.0554/ 0.0461 | 0.0506/ 0.0413 | 0.0937/ 0.0922 |
| ✓ ✓ 0 | | 0.1849/ 0.1350 | 0.0568/ 0.0466 | 0.0532/ 0.0416 | 0.0986/ 0.0929 |
| 0 ✓ ✓ | | 0.1583/ 0.1251 | 0.0620/ 0.0514 | 0.0654/ 0.0540 | 0.0986/ 0.0954 |
| ✓ 0 ✓ | | 0.1615/ 0.1331 | 0.0584/ 0.0487 | 0.0527/ 0.0424 | 0.0999/ 0.0982 |
| ✓ ✓ ✓ | LINKPROP | 0.1814/ 0.1477 | 0.0676/ 0.0559 | 0.0684/ 0.0559 | 0.1054/ 0.1025 |

US 12,694,308 B2

From Table 5, it can be seen that, as expected, excluding all parameters performs the worst except on Gowalla with respect to NDCG@20. Likewise, if the single parameter models are compared, then δ for $i_2$ is the most crucial, except for on Gowalla. If the performance of the models is compared using two parameters, it can be seen that each dataset varies on which combination provides the strongest result. Finally, it can be seen that using all three parameters provides the strongest results.

In addition, the linkage scores computed by the disclosed method may be compared against existing standard linkage scores CN, SC, LHN and PD by fixing those parameters to specific values. Table 5 also demonstrates that LINKPROP outperforms all of them by a large margin on all four datasets. This indicates the importance of making all of those parameters learnable.

Since the final metric is used to learn the parameters, the metric can be easily changed to one used for the described recommendation system. Table 6 shows the additional gains in Recall@20 achieved by switching the metric from NDCG@20 to Recall@20.

TABLE 6

Performance when optimizing for recall.

| | Datasets | |
| Metrics | Gowalla Recall@20 | Yelp2018 Recall@20 |
| --- | --- | --- |
| MF | 0.1299 | 0.0436 |
| NeuCF | 0.1406 | 0.045 |
| GC-MC | 0.1395 | 0.0462 |
| NGCF | 0.156 | 0.0581 |
| Mult-VAE | 0.1641 | 0.0584 |
| DGCF | 0.1794 | 0.064 |
| LightGCN | 0.1823 | 0.0649 |
| GTN | 0.187 | 0.0679 |
| LINKPROP | 0.1814 | 0.0679 |
| LINKPROP-MULTI | 0.1917 | 0.0700 |
| Rel. Improvement (%) | 2.51 | 3.09 |

The robustness of the described recommendation method against GNN-based CF models when noise is added to the interaction data has been compared. The experimental settings proposed by GTN were followed where fake interactions were randomly inserted into the clean interaction graph such that the noise ratio k as the percentage of the total interactions in the graph are fake. As shown in FIGS. 4A-4H, the described recommendation method maintains its effectiveness at a noise ratio of 30% or less. Notably, compared to LightGCN, the described recommendation method is much more robust across all noise ratios. When comparing with GTN, the described recommendation method has the most robustness, although at a comparatively lower efficacy. However, this is expected since GTN is specifically designed to be robust to interaction noise.

The recommendation system and methods described herein have introduced a lightweight link propagation model for item recommendations, which significantly outperforms complex conventional models. The method shifts away from the popular paradigm of creating complex (GNN-based) models which first learn user and item representations for finding matches, and instead opts to directly predict the existence of links. This link prediction setup is the most natural one for item recommendations, which is supported by test results showing that even simple linkage score baselines beat conventional GNN-based CF models. Coupled with an iterative entity degree update component, the LINKPROP-MULTI method achieves the best performance across multiple benchmarks, including a significant margin of over 60% improvement on Amazon-Book over conventional methods. Furthermore, such vast improvements incur low computational complexity due to the simplicity of the model with six learnable parameters. The computed linkage score also differs from conventional methods in that it further generalizes to include the neighbors between the nodes of the target link and uses more than one parameter to control the individual degree terms.

Figure 5:
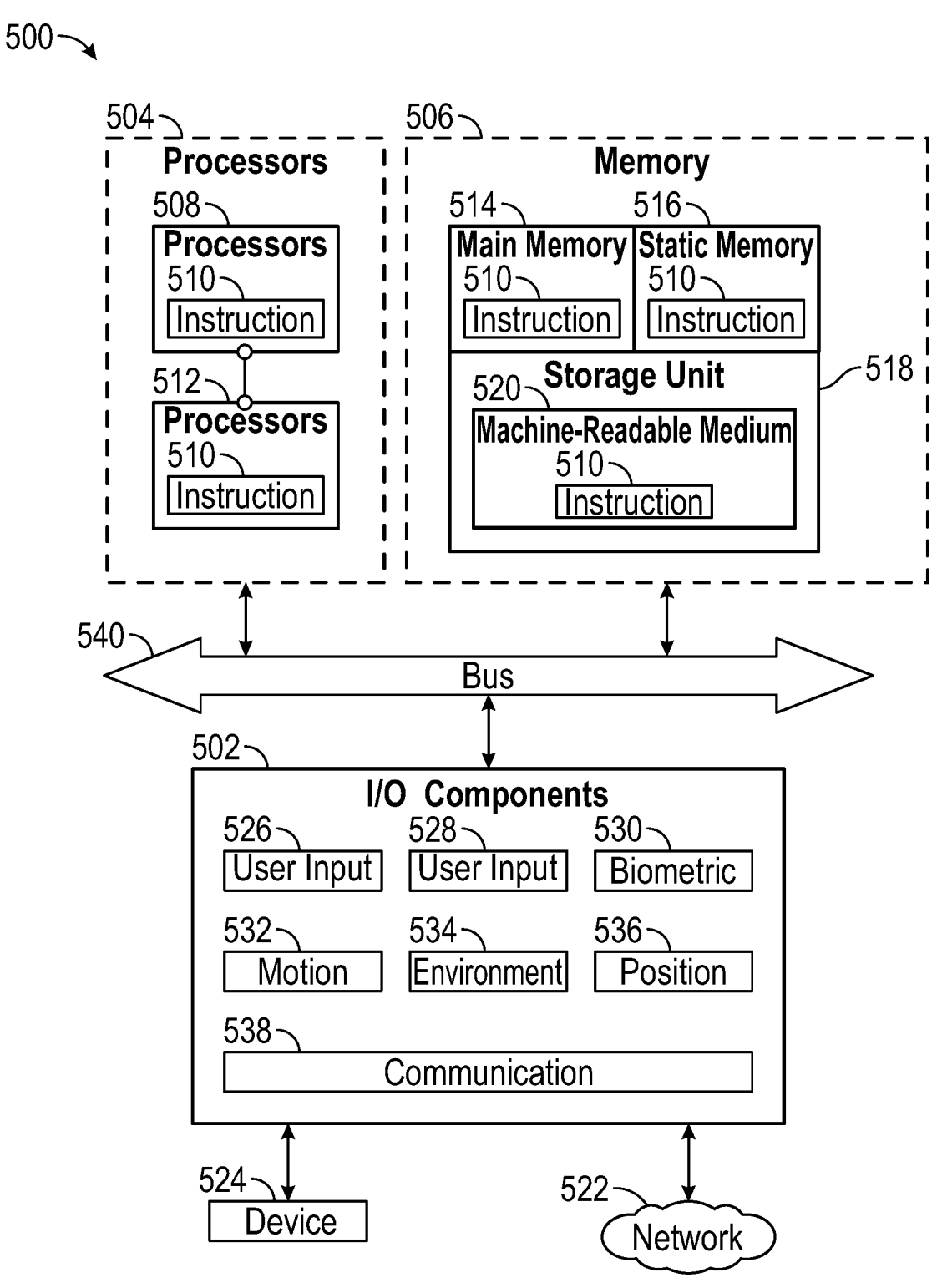
FIG. 5 is a block diagram of a machine within which instructions (e.g., software, a program, an application, an applet, an app, or other executable code) for causing the machine to perform any one or more of the methodologies discussed herein may be executed.

FIG. 5 is a diagrammatic representation of the machine 500 within which instructions 510 (e.g., software, a program, an application, an applet, an app, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may implement the recommendation system of FIG. 2 and the linkage score algorithm of FIG. 3. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 for any one or more of the methodologies or functions described herein. The instructions 510 may also reside, completely or partially, within the main memory 514, within the static memory 516, within machine-readable medium 520 within the storage unit 518, within at least one of the processors 504 (e.g., within the Processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface Component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Figure 6:
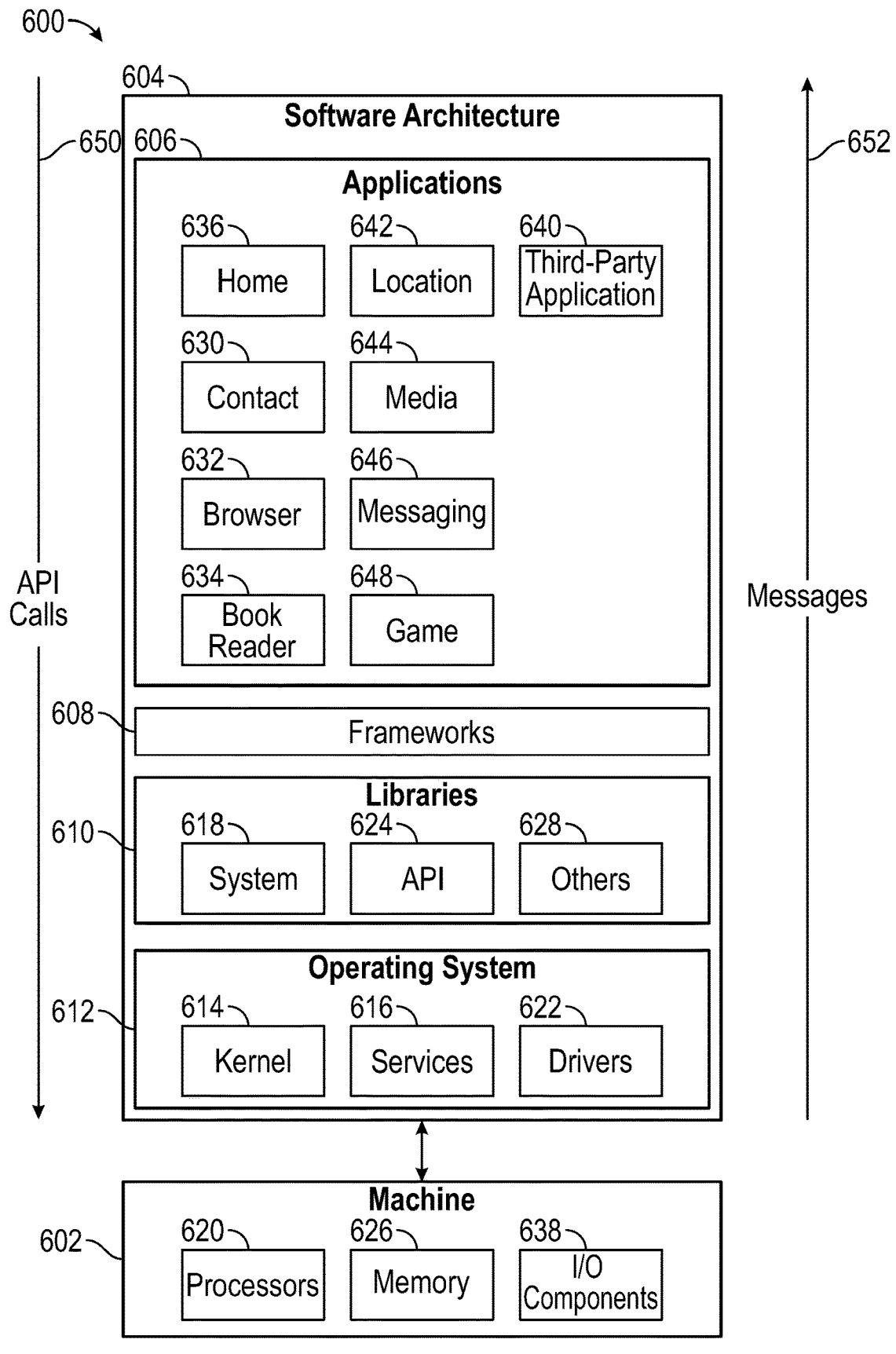
FIG. 6 is a block diagram showing a software architecture within which examples described herein may be implemented.

FIG. 6 is a block diagram 600 illustrating a software architecture 604, which can be installed on any one or more of the devices described herein. The software architecture 604 is supported by hardware such as a machine 602 (see FIG. 5) that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLU-ETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to generate one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A search system for searching a dataset of user and item nodes to identify at least one item in the dataset to recommend to a user, comprising:

a user-item bipartite graph of nodes connecting at least one user and the at least one item; and a processor that recommends the at least one item in the user-item bipartite graph to the user by executing instructions to perform operations comprising:

computing linkage scores from the user-item bipartite graph to weigh propagated links between respective nodes of the user-item bipartite graph from user u to an item i to be searched as inversely proportional to a number of nodes of the user-item bipartite graph connecting the user u to the item i, wherein computing the linkage scores comprises computing a linkage score $\hat{y}$ for all user-item pairs of length 3 from a node degrees set P including a number of nodes of the user-item bipartite graph and every path of length 3 between user-item pairs ((u,i) pairs) as:

$$\hat{y}(i_2 \mid u_1) \sum_{(ix,ux) \in P(u1,i2)} \left( d_{u1}^{\alpha} \cdot d_{ix}^{\beta} \cdot d_{ux}^{\gamma} \cdot d_{i2}^{\delta} \right)^{-1}$$

for intermediate nodes ix and ux between user node u1 and item node i2 in the user-item bipartite graph, where d is a node degree of respective nodes of the user-item bipartite graph of respective paths of length 3 between each user and item and $\alpha$, $\beta$, $\gamma$, $\delta$ are learnable input parameters;

sorting the propagated links in the user-item bipartite graph by linkage scores;

adding a top predetermined percent of new propagated links with highest linkage scores to the user-item bipartite graph to obtain an updated user-item bipartite graph;

repeating computing linkage scores, sorting the propagated links, and adding the new propagated links using the updated user-item bipartite graph to obtain a final recommendation search matrix;

performing a search of the dataset for the at least one item to recommend to the user using the final recommendation search matrix; and displaying, based on a result of the search, the at least one item to the user on a user interface.

2. The system of claim 1, wherein the processor executes instructions to compute linkage scores from the user-item bipartite graph by executing instructions to preprocess the user-item bipartite graph to obtain the node degrees set P.

3. The system of claim 2, wherein the processor executes instructions to compute linkage scores from the user-item bipartite graph by further executing instructions to compute the linkage scores using the node degrees for every path of length 3 between the user-item pairs from set P and to accumulate the computed linkage scores.

4. The system of claim 3, wherein the processor executes instructions to compute linkage scores from the user-item bipartite graph by further executing instructions to compute the linkage score for all user-item pairs of length 3 as a function of (1) the node degree d of respective nodes of the user-item bipartite graph of respective paths of length 3 between each user and item and (2) the learnable input parameters.

5. The system of claim 4, wherein the processor further executes instructions to optimize the learnable input parameters using a training algorithm.

6. The system of claim 1, wherein the processor further executes instructions to compute linkage scores from the user-item bipartite graph by executing instructions to compute the final recommendation search matrix L as:

$$L = (D_{\alpha,\beta} \odot M) M^T (M \odot D_{\gamma,\delta})$$

where $\odot$ indicates a Hadamard product, $D_{\alpha,\beta}$ is a matrix version of $d_{u1}^{\alpha} \cdot d_{ix}^{\beta}$, $D_{\gamma,\delta}$ is a matrix version of $d_{ux}^{\gamma} \cdot d_{i2}^{\delta}$, a number of paths of length 3 between a node u and i is given by $[(MM^T)M]_{ui}$ where $M^T$ is a transpose of matrix M, and $L_{j,k} = \hat{y}(i_k \mid u_j)$ for respective items $i_k$ and respective users $u_j$.

7. A computer-implemented method of searching a dataset of nodes to identify at least one item in the dataset to recommend to a user using a user-item bipartite graph of nodes connecting at least one user and the at least one item, the method comprising:

computing linkage scores from the user-item bipartite graph to weigh propagated links between respective user and item nodes of the user-item bipartite graph from a user u to an item i to be searched as inversely proportional to a number of nodes of the user-item bipartite graph connecting the user u to the item i, wherein computing the linkage scores comprises computing a linkage score $\hat{y}$ for all user-item pairs of length 3 from a node degrees set P including a number of nodes of the user-item bipartite graph and every path of length 3 between user-item pairs ((u,i) pairs) as:

$$\hat{y}(i_2 \mid u_1) \sum_{(ix,ux) \in P(u1,i2)} \left( d_{u1}^{\alpha} \cdot d_{ix}^{\beta} \cdot d_{ux}^{\gamma} \cdot d_{i2}^{\delta} \right)^{-1}$$

for intermediate nodes ix and ux between user node u1 and item node i2 in the user-item bipartite graph, where d is a node degree of respective nodes of the user-item bipartite graph of respective paths of length 3 between each user and item and $\alpha$, $\beta$, $\gamma$, $\delta$ are learnable input parameters;

sorting the propagated links in the user-item bipartite graph by linkage scores;

adding a top predetermined percent of new propagated links with highest linkage scores to the user-item bipartite graph to obtain an updated user-item bipartite graph;

repeating computing linkage scores, sorting the propagated links, and adding the new propagated links using the updated user-item bipartite graph to obtain a final recommendation search matrix; and performing a search of the dataset for the at least one item to recommend to the user using the final recommendation search matrix; and displaying, based on a result of the search, the at least one item to the user on a user interface.

8. The method of claim 7, wherein computing linkage scores from the user-item bipartite graph comprises preprocessing the user-item bipartite graph to obtain the node degrees set P.

9. The method of claim 8, wherein computing linkage scores from the user-item bipartite graph further comprises computing the linkage scores using the node degrees for every path of length 3 between the user-item pairs from set P and accumulating the computed linkage scores.

10. The method of claim 9, wherein computing linkage scores from the user-item bipartite graph further comprises computing the linkage score for all user-item pairs of length 3 as a function of (1) the node degree d of respective nodes of the user-item bipartite graph of respective paths of length 3 between each user and item and (2) the learnable input parameters.

11. The method of claim 10, further comprising optimizing the learnable input parameters using a training algorithm.

12. The method of claim 7, wherein computing linkage scores from the user-item bipartite graph further comprises computing the final recommendation search matrix L as:

$$L = (D_{\alpha,\beta} \odot M)M^{T}(M \odot D_{\gamma,\delta})$$

where $\odot$ indicates a Hadamard product, $D_{\alpha,\beta}$ is a matrix version of $d^{\alpha}_{u1} \cdot d^{\beta}_{ix}$, $D_{\gamma,\delta}$ is a matrix version of $d^{\gamma}_{ux} \cdot d^{\delta}_{i2}$, a number of paths of length 3 between a node u and i is given by $[(MM^{T})M]_{ui}$ where $M^{T}$ is a transpose of matrix M, and $L_{j,k} = \hat{y}(i_k|u_j)$ for respective items $i_k$ and respective users $u_j$.

13. A non-transitory computer-readable storage medium, the computer-readable storage medium including instructions that when executed by a processor cause the processor to search a dataset of user and item nodes to identify at least one item in the dataset to recommend to a user using a user-item bipartite graph of nodes connecting at least one user and the at least one item by performing operations comprising:

computing linkage scores from the user-item bipartite graph to weigh propagated links between respective nodes of the user-item bipartite graph from a user u to an item i to be searched as inversely proportional to a number of nodes of the user-item bipartite graph connecting user u to the item i, wherein computing the linkage scores comprises computing a linkage score $\hat{y}$ for all user-item pairs of length 3 from a node degrees set P including a number of nodes of the user-item bipartite graph and every path of length 3 between user-item pairs ((u,i) pairs) as:

$$\hat{y}(i_2 \mid u_1) \sum\nolimits_{(ix,ux) \in P(u1,i2)} \left(d^{\alpha}_{u1} \cdot d^{\beta}_{ix} \cdot d^{\gamma}_{ux} \cdot d^{\delta}_{i2}\right)^{-1}$$

for intermediate nodes ix and ux between user node $u_1$ and item node $i_2$ in the user-item bipartite graph, where d is a node degree of respective nodes of the user-item bipartite graph of respective paths of length 3 between each user and item and $\alpha$, $\beta$, $\gamma$, $\delta$ are learnable input parameters;

sorting the propagated links in the user-item bipartite graph by linkage scores;

adding a top predetermined percent of new propagated links with highest linkage scores to the user-item bipartite graph to obtain an updated user-item bipartite graph;

repeating computing linkage scores, sorting the propagated links, and adding the new propagated links using the updated user-item bipartite graph to obtain a final recommendation search matrix;

performing a search of the dataset for the at least one item to recommend to the user using the final recommendation search matrix; and displaying, based on a result of the search, the at least one item to the user on a user interface.

14. The computer-readable storage medium of claim 13, wherein the instructions for computing linkage scores from the user-item bipartite graph comprise instructions for preprocessing the user-item bipartite graph to obtain the node degrees set P.

15. The computer-readable storage medium of claim 14, wherein the instructions for computing linkage scores from the user-item bipartite graph further comprise instructions for computing the linkage scores using the node degrees for every path of length 3 between the user-item pairs from set P and accumulating the computed linkage scores.

16. The computer-readable storage medium of claim 15, wherein the instructions for computing linkage scores from the user-item bipartite graph further comprise instructions for computing the linkage score for all user-item pairs of length 3 as a function of the node degree d of respective nodes of the user-item bipartite graph of respective paths of length 3 between each user and item and the learnable input parameters.

17. The computer-readable storage medium of claim 16, wherein the instructions further comprise instructions for optimizing the learnable input parameters using a training algorithm.

\* \* \* \* \*